(12) United States Patent
Chaganti et al.

(10) Patent No.: US 11,340,950 B2
(45) Date of Patent: May 24, 2022

(54) SERVICE BAND MANAGEMENT SYSTEM

(71) Applicant: Dell Products L.P., Round Rock, TX (US)

(72) Inventors: Ravikanth Chaganti, Karnataka (IN); Dharmesh M. Patel, Round Rock, TX (US); Rizwan Ali, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 228 days.

(21) Appl. No.: 16/655,871

(22) Filed: Oct. 17, 2019

(65) Prior Publication Data

US 2021/0117233 A1   Apr. 22, 2021

(51) Int. Cl.
*G06F 9/50* (2006.01)

(52) U.S. Cl.
CPC ............ *G06F 9/505* (2013.01); *G06F 9/5044* (2013.01); *G06F 9/5066* (2013.01)

(58) Field of Classification Search
None
See application file for complete search history.

(56) References Cited

U.S. PATENT DOCUMENTS

| 7,996,842 | B2 | 8/2011 | Savit | |
| 10,628,228 | B1* | 4/2020 | Theunissen | H04L 41/5054 |
| 2005/0226249 | A1* | 10/2005 | Moore | H04Q 3/0066 370/395.21 |
| 2008/0195404 | A1* | 8/2008 | Chron | G06Q 10/06 705/1.1 |
| 2009/0119673 | A1 | 5/2009 | Bubba | |
| 2020/0142753 | A1* | 5/2020 | Harwood | G06F 9/45558 |

* cited by examiner

*Primary Examiner* — Eric C Wai
(74) *Attorney, Agent, or Firm* — Joseph Mencher

(57) ABSTRACT

A service band management system includes management device(s) coupled to a workload provisioning infrastructure. The management device(s) identify a first workload provisioning system in a workload provisioning infrastructure, and determine its first workload provisioning capability. Based on the first workload provisioning capability, the management device(s) map the first workload provisioning system to a first service band, and provision a workload using the first workload provisioning system based on the first service band satisfying a workload requirement for the workload. Subsequently, the management device(s) identify that a second workload provisioning system has been added to the workload provisioning infrastructure, and determine its second workload provisioning capability. Based on the first workload provisioning capability and the second workload provisioning capability, the management device(s) automatically remap the first workload provisioning system to a second service band that is different than the first service band.

20 Claims, 11 Drawing Sheets

SERVICE BAND MANAGEMENT SYSTEM

BACKGROUND

The present disclosure relates generally to information handling systems, and more particularly to managing service bands provided for information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are included in enterprise infrastructures that provide for the performance of workloads. For example, an enterprise infrastructure may include a plurality of server devices, storage devices, and/or other infrastructure components that are utilized to provide for the performance of workloads generated by host systems. Within an enterprise infrastructure, workload placement is typically performed based on Quality of Service (QoS) requirements for the workloads, and one of skill in the art will recognize that different workloads may require different QoS's. As such, for any particular workload, the device(s) and/or device component(s) that are utilized in providing that workload may be selected based on their QoS characteristics meeting the QoS requirements for that workload. Furthermore, enterprise infrastructures typically define QoS service bands (e.g., a "platinum" service band, a "gold" service band, a "silver" service band, and a "bronze" service band) that are made up of device(s) and/or device component(s) that include QoS characteristics that are known to provide a predefined range of performance characteristics (e.g., predefined levels of Gbps throughput to a network, Input/Output Operations Per Second (IOPS), latency, and/or other performance characteristics known in the art.) However, over time, device(s) and/or device component(s) may be added to the enterprise infrastructure and/or QoS requirements for workloads may change, and workload placements in the enterprise infrastructure based on the QoS service bands defined before those additions and/or changes may become outdated. In such situations, conventional enterprise infrastructures require a manual update of the QoS service bands and workload placements by an administrator of the enterprise infrastructure, which is time-consuming and error-prone.

Accordingly, it would be desirable to provide a service band management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a service band management engine that is configured to: identify a first workload provisioning system that is included in a workload provisioning infrastructure; determine a first workload provisioning capability for the first workload provisioning system; map, based on the first workload provisioning capability, the first workload provisioning system to a first service band that is included in a plurality of service bands; provision a workload using the first workload provisioning system based on the first service band satisfying a workload requirement for the workload; identify, subsequent to provisioning a workload using the first workload provisioning system, that a second workload provisioning system has been added to the workload provisioning infrastructure; determine a second workload provisioning capability for the second workload provisioning system; and automatically remap, based on the first workload provisioning capability and the second workload provisioning capability, the first workload provisioning system to a second service band that is included in the plurality of service bands and that is different than the first service band.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
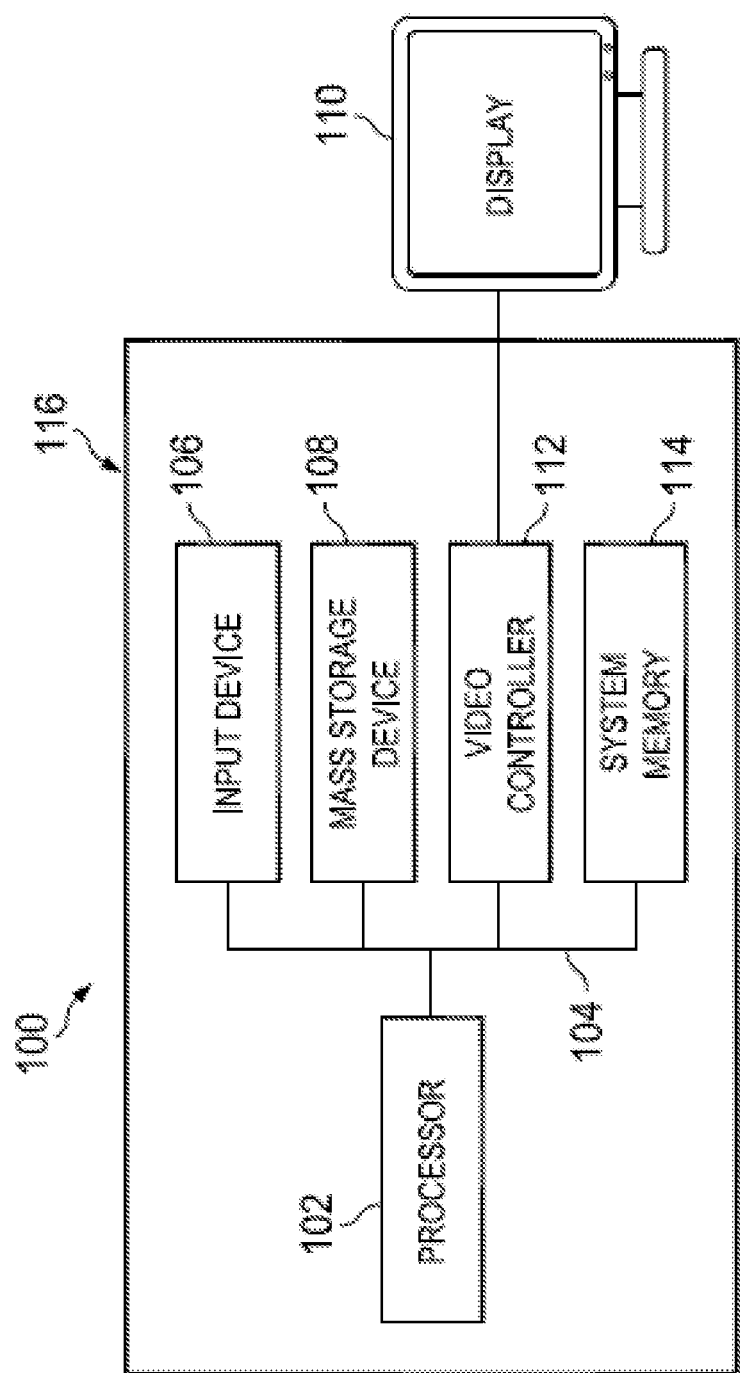
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
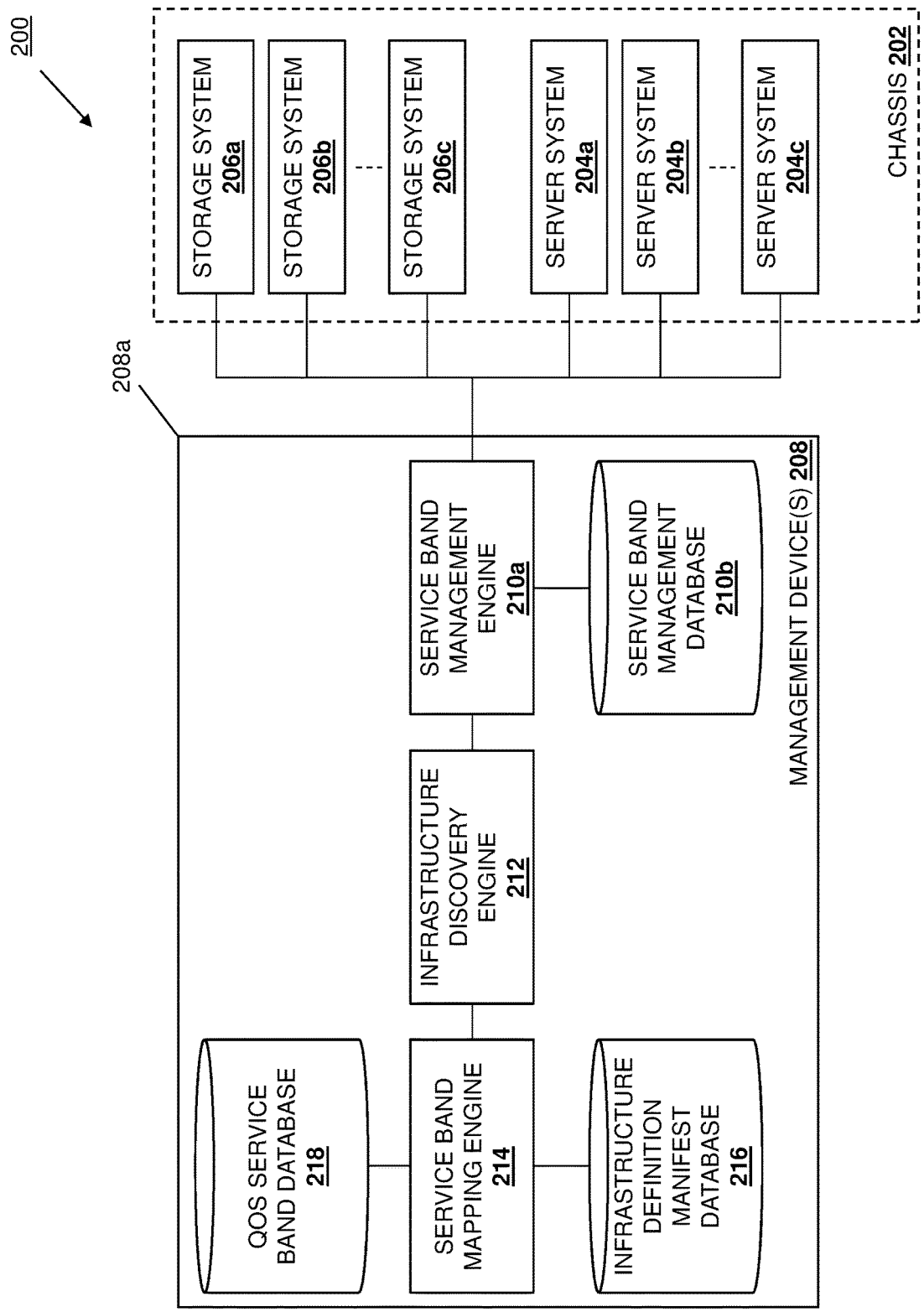
FIG. 2 is a schematic view illustrating an embodiment of a service band management system.

Referring now to FIG. 2, an embodiment of a service band management system 200 is illustrated. In the illustrated embodiment, the service band management system 200 includes one or more workload provisioning infrastructure chassis such as the chassis 202 illustrated and discussed below, which may be provided by one or more racks (e.g., server racks, storage racks, etc.) and/or other chassis components known in the art. As discussed below, the chassis 202 may house a variety of workload provisioning infrastructure systems such as the server systems 204a, 204b, and up to 204c, and the storage systems 206a, 206b, and up to 206c, illustrated in FIG. 2. In an embodiment, any or all of the server systems 204a-204c may be provided by the IHS 100 discussed above with reference to FIG. 1, and/or may include some or all of the components of the IHS 100. Similarly, any or all of the storage systems 206a-206c may be provided by the IHS 100 discussed above with reference to FIG. 1, and/or may include some or all of the components of the IHS 100. However, while illustrated and discussed as a including particular server systems and storage systems, one of skill in the art in possession of the present disclosure will recognize that workload provisioning infrastructure systems included in a workload provisioning infrastructure may include any systems and/or devices that may be configured to operate similarly as the server devices and storage devices to provide workloads as discussed below.

As illustrated in FIG. 2, one or more management devices 208 may be coupled to the server systems 204a-204c and storage systems 206a-206c that provide the workload provisioning infrastructure in FIG. 2, and one of skill in the art in possession of the present disclosure will recognize that the management device(s) 208 may be located at the same physical location as the workload provisioning infrastructure (e.g., "on-premises" and at the same location as the server devices 204a-204c and storage devices 206a-206c), or may be coupled to the workload provisioning infrastructure via a network (e.g., as a "cloud service" coupled to the server devices 204a-204c and storage devices 206a-206c via a Local Area Network (LAN), the Internet, etc.) In an embodiment, the management device(s) 208 may be provided by the IHS 100 discussed above with reference to FIG. 1, and/or may include some or all of the components of the IHS 100, and in specific examples may include one or more management server devices, although other management devices will fall within the scope of the present disclosure as well. As such, the management device(s) 208 may be provided in one or more chassis 208a that house the components of the management device(s) 208, only some of which are illustrated in FIG. 2. For example, the chassis 208a may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a service band management engine 210a that is configured to perform the functionality of the service band management engines and/or management devices discussed below.

The chassis 208a may also house one or more storage devices (not illustrated, but which may include the storage 108 discussed above with reference to FIG. 1) that are coupled to the service band management engine 210a (e.g., via a coupling between the storage device(s) and the processing system) and that includes a service band management database 210b that is configured to store any of the information utilized by the service band management engine 210a discussed below. The memory system included in the chassis 208a may also include instructions that, when executed by the processing system, cause the processing system to provide an infrastructure discovery engine 212 that is coupled to the service band management engine 210a and that is configured to perform the functionality of the infrastructure discovery engines and/or management devices discussed below. The memory system included in the chassis 208a may also include instructions that, when executed by the processing system, cause the processing system to provide a service band mapping engine 214 that is coupled to the infrastructure discovery engine 212 and that is configured to perform the functionality of the service band mapping engines and/or management devices discussed below. While illustrated and discussed as three "separate" engines, one of skill in the art in possession of the present disclosure will appreciate that the service band management engine 210a, the infrastructure discovery engine 212, and the service band mapping engine 214 may be provided as an integrated component as well. As such, any or each of the service band management engine 210a, the infrastructure discovery engine 212, and the service band mapping engine 214 may be provided by a respective, dedicated processing device in the processing system included in the management device(s) 208, or may be provided by the same processing device in the processing system included in the management device(s) 208 as at least one other engine, while remaining within the scope of the present disclosure.

In an embodiment, the storage device(s) included in the chassis 208a may include an infrastructure definition manifest database 216 and a Quality of Service (QoS) service band database 218, each of which is coupled to the service band management database 214, and each of which is configured to store any of the information utilized by the service band mapping engine 214 discussed below. While illustrated and discussed as three "separate" databases, one of skill in the art in possession of the present disclosure will appreciate that the service band management database 210b, the infrastructure definition manifest database 216, and the QoS service band database 218 may be provided as an integrated component as well. As such, any or each of the service band management database 210b, the infrastructure definition manifest database 216, and the QoS service band database 218 may be provided by a respective, dedicated storage device in the storage device(s) included in the management device(s) 208, or may be provided by the same storage device in the storage device(s) included in the management device(s) 208 as at least one other database, while remaining within the scope of the present disclosure. Furthermore, while a specific service band management system 200 has been illustrated, one of skill in the art in possession of the present disclosure will recognize that service band management systems (or other systems operating according to the teachings of the present disclosure in a manner similar to that described below for the service band management system 200) may include a variety of components and/or component configurations for providing conventional functionality, as well as the functionality discussed below, while remaining within the scope of the present disclosure as well.

Figure 3:
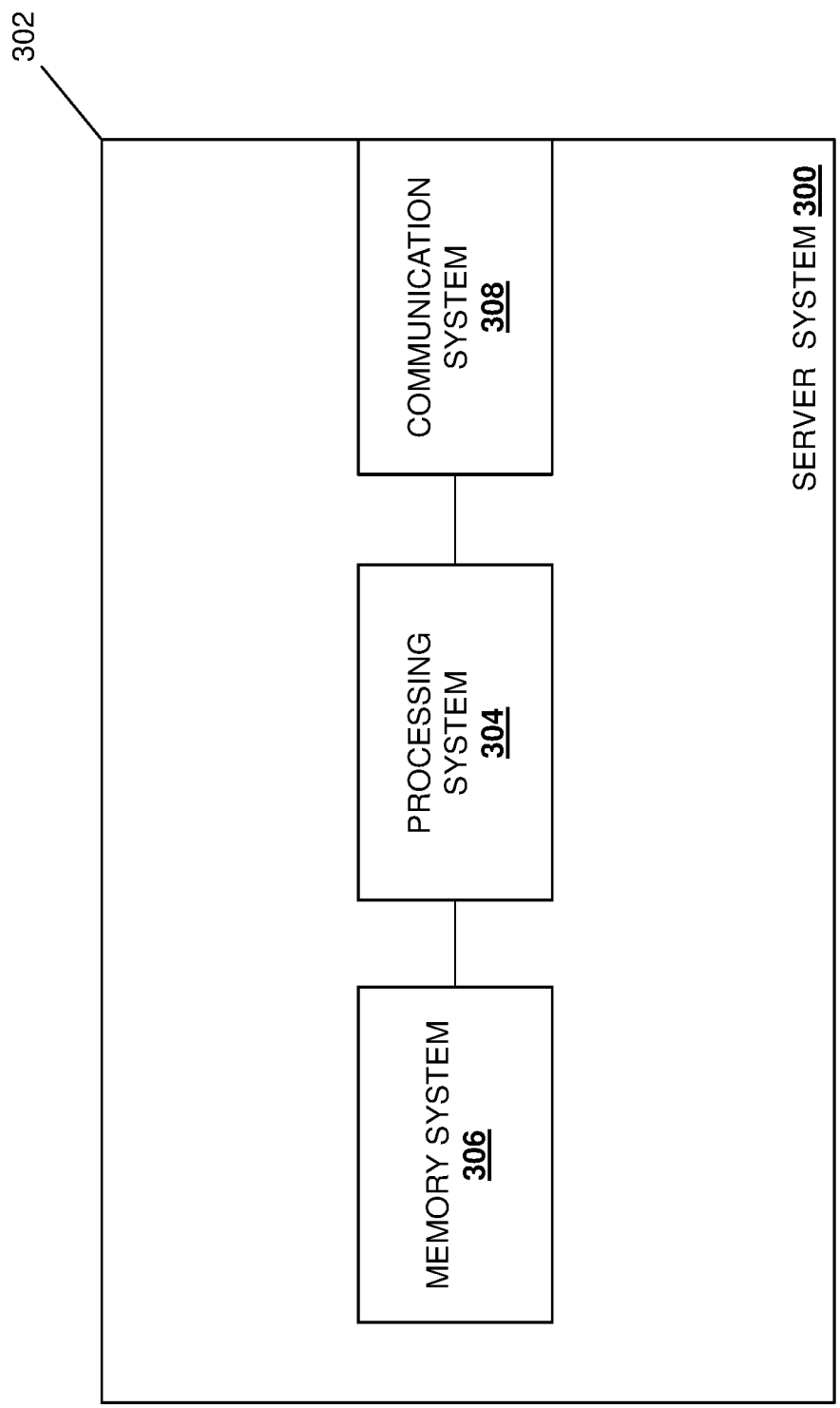
FIG. 3 is a schematic view illustrating an embodiment of a server system that may be included in the service band management system of FIG. 2.

Referring now to FIG. 3, an embodiment of a server system 300 is illustrated that may provide any or all of the server systems 204a-204c discussed above with reference to FIG. 2. As such, the server system 300 may be provided by the IHS 100 discussed above with reference to FIG. 1 and/or may include some or all of the components of the IHS 100. Furthermore, while illustrated and discussed as a server device, one of skill in the art in possession of the present disclosure will recognize that the functionality of the server system 300 discussed below may be provided by other devices that are configured to operate similarly as the server system 300 discussed below. In the illustrated embodiment, the server system 300 includes a chassis 302 that houses the components of the server system 300, only some of which are illustrated below. For example, the chassis 302 may house a processing system 304 and a memory system 306 that is coupled to the processing system 304 and that includes instructions that, when executed by the processing system 304, cause the processing system 304 to provide provision workloads and/or perform the functionality of the server systems discussed below.

The chassis 302 may also house a communication system 308 that is coupled to the processing system 304 (and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific server system 300 with only particular server components has been illustrated, one of skill in the art in possession of the present disclosure will recognize that server systems (or other devices operating according to the teachings of the present disclosure in a manner similar to that described below for the server system 300) may include a variety of components and/or component configurations (e.g., the storage devise discussed below) for provisioning workloads while remaining within the scope of the present disclosure as well.

Figure 4:
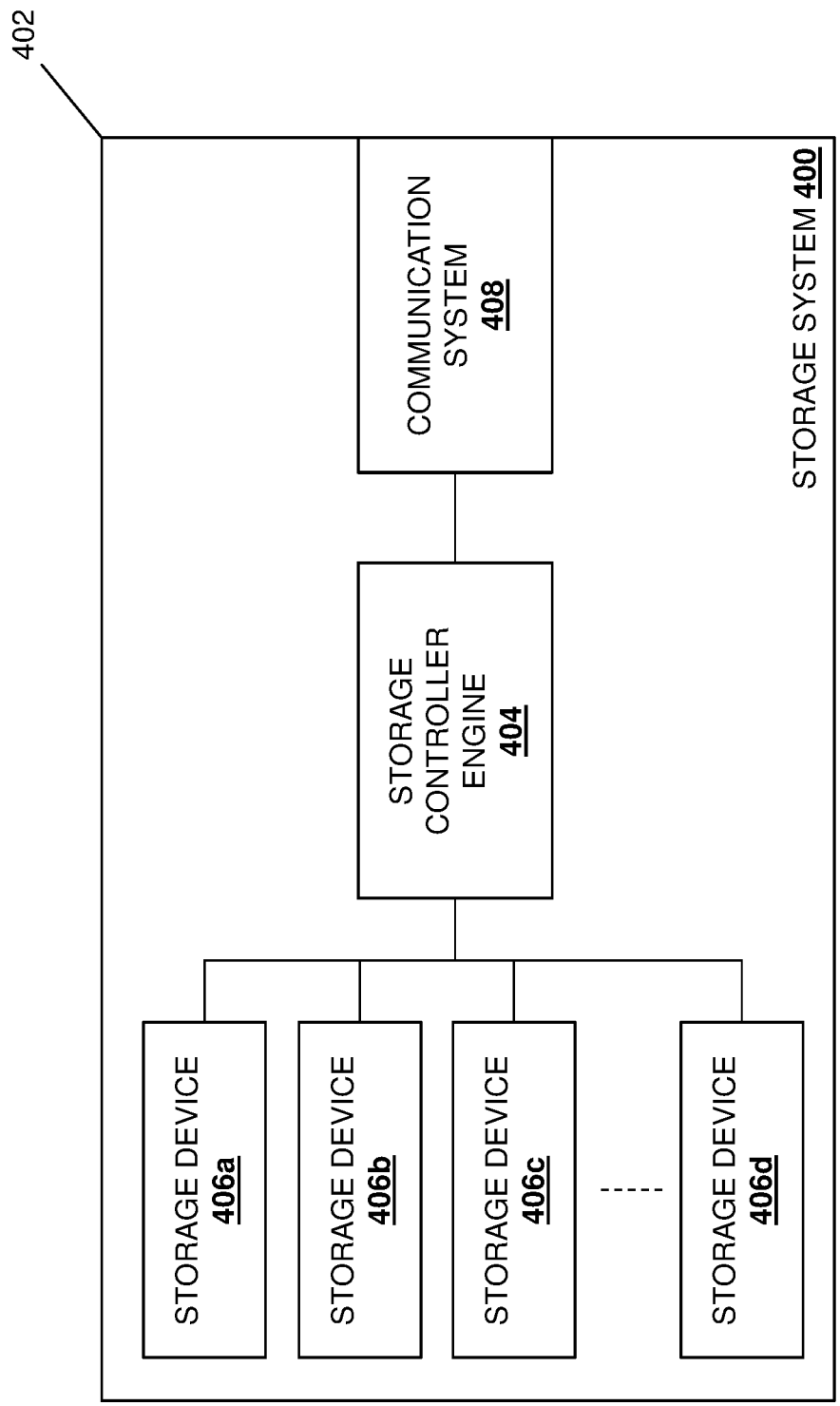
FIG. 4 is a schematic view illustrating an embodiment of a storage system that may be included in the service band management system of FIG. 2.

Referring now to FIG. 4, an embodiment of a storage system 400 is illustrated that may provide any or all of the storage systems 206a-206c discussed above with reference to FIG. 2. As such, the storage system 400 may be provided by the IHS 100 discussed above with reference to FIG. 1 and/or may include some or all of the components of the IHS 100. Furthermore, while illustrated and discussed as a storage device sled including a plurality of storage devices, one of skill in the art in possession of the present disclosure will recognize that the functionality of the storage system 400 discussed below may be provided by other devices that are configured to operate similarly as the storage system 400 discussed below. In the illustrated embodiment, the storage system 400 includes a chassis 402 that houses the components of the storage system 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a storage controller engine 404 that is configured to perform the functionality of the storage controller engines and storage systems discussed below.

In the illustrated embodiment, the chassis 402 also houses a plurality of storage devices 406a, 406b, 406c, and up to 406d, each of which may be coupled to the storage controller engine 404 (e.g., via a coupling between the processing system and the storage devices 406a-406d). As discussed below, a variety of different storage device technologies may be utilized by the storage devices 406a-406d in any particular storage system 400/206a-206c, including Solid State Drive (SSD) storage devices (e.g., Non-Volatile Memory express (NVMe) SSD storage devices), Hard Disk Drive (HDD) storage devices, and/or other storage devices that would be apparent to one of skill in the art in possession of the present disclosure. The chassis 402 may also house a communication system 408 that is coupled to the storage controller engine 404 (e.g., via a coupling between the processing system and the communication system 408) and that may be provided by a variety of storage system communication components that would be apparent to one of skill in the art in possession of the present disclosure. While a specific storage system 400 with only particular storage components has been illustrated, one of skill in the art in possession of the present disclosure will recognize that storage systems (or other devices operating according to the teachings of the present disclosure in a manner similar to that described below for the storage system 400) may include a variety of components and/or component configurations for provisioning workloads while remaining within the scope of the present disclosure as well.

Figure 5:
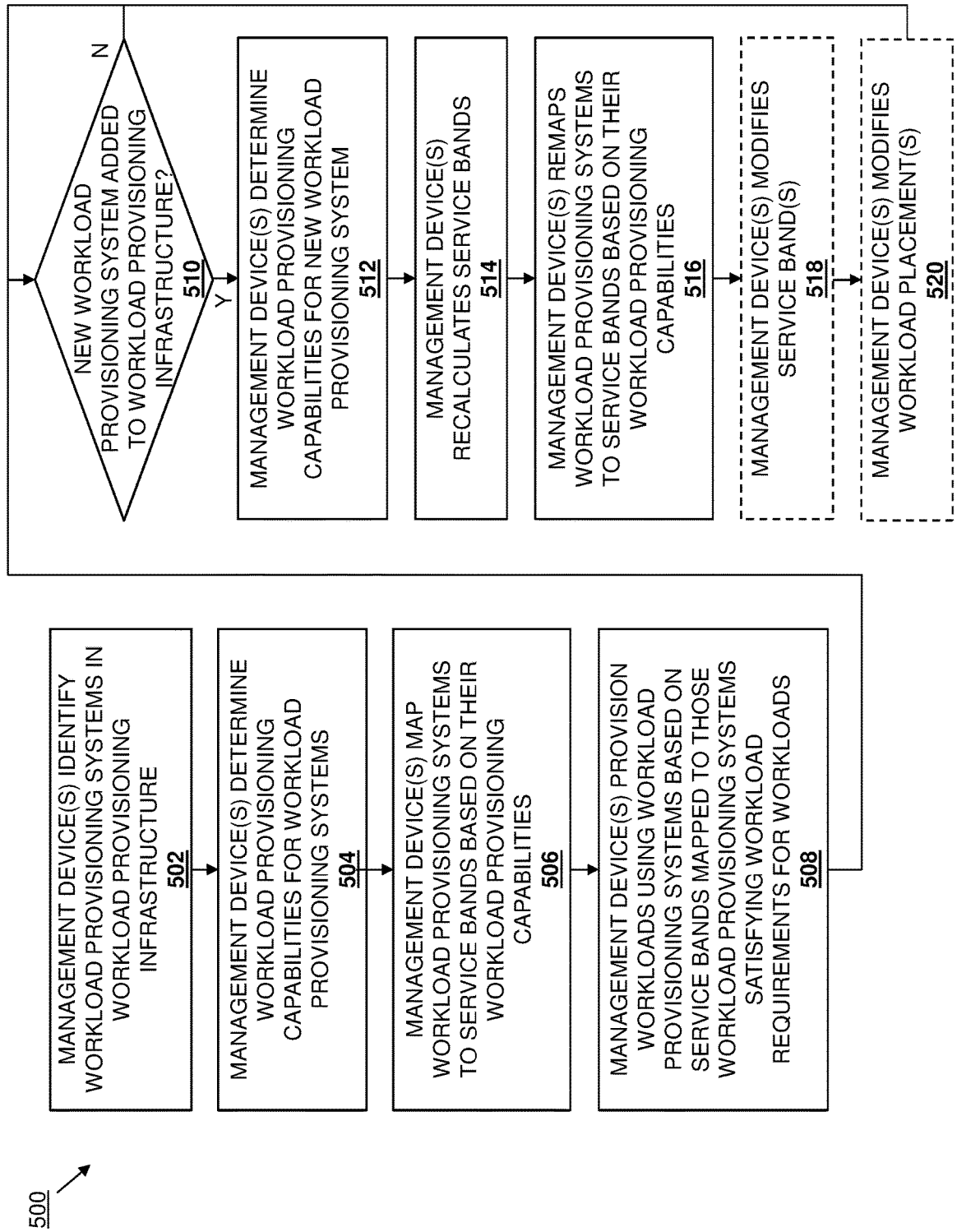
FIG. 5 is a flow chart illustrating an embodiment of a method for managing service bands.

Referring now to FIG. 5, an embodiment of a method 500 for managing service bands is illustrated. As discussed below, the systems and methods of the present disclosure provide for the management of service bands (e.g., "platinum", "gold", "silver", and "bronze" service bands) utilized in the provisioning of workloads via a workload provisioning infrastructure. For example, when new workload provisioning systems are added to the workload provisioning infrastructure, those new workload provisioning systems may be identified, and the workload provisioning capabilities for those new workload provisioning systems may be determined. In addition, the prior utilization of the workload provisioning systems by the workloads provided by those workload provisioning systems (prior to the addition of the new workload provisioning systems) may be determined, and the service bands may be recalculated and/or the workload provisioning systems (including the new workload provisioning systems) may be mapped/remapped to service bands based on their workload provisioning capabilities and prior utilization of the workload provisioning systems. As such, the systems and methods of the present disclosure may operate to modify the definitions of service bands and/or modify workload placements whenever a situation is discovered that allows for the optimization of the utilization of the workload provisioning infrastructure in provisioning workloads based on the requirements for those workloads.

Figure 6A:
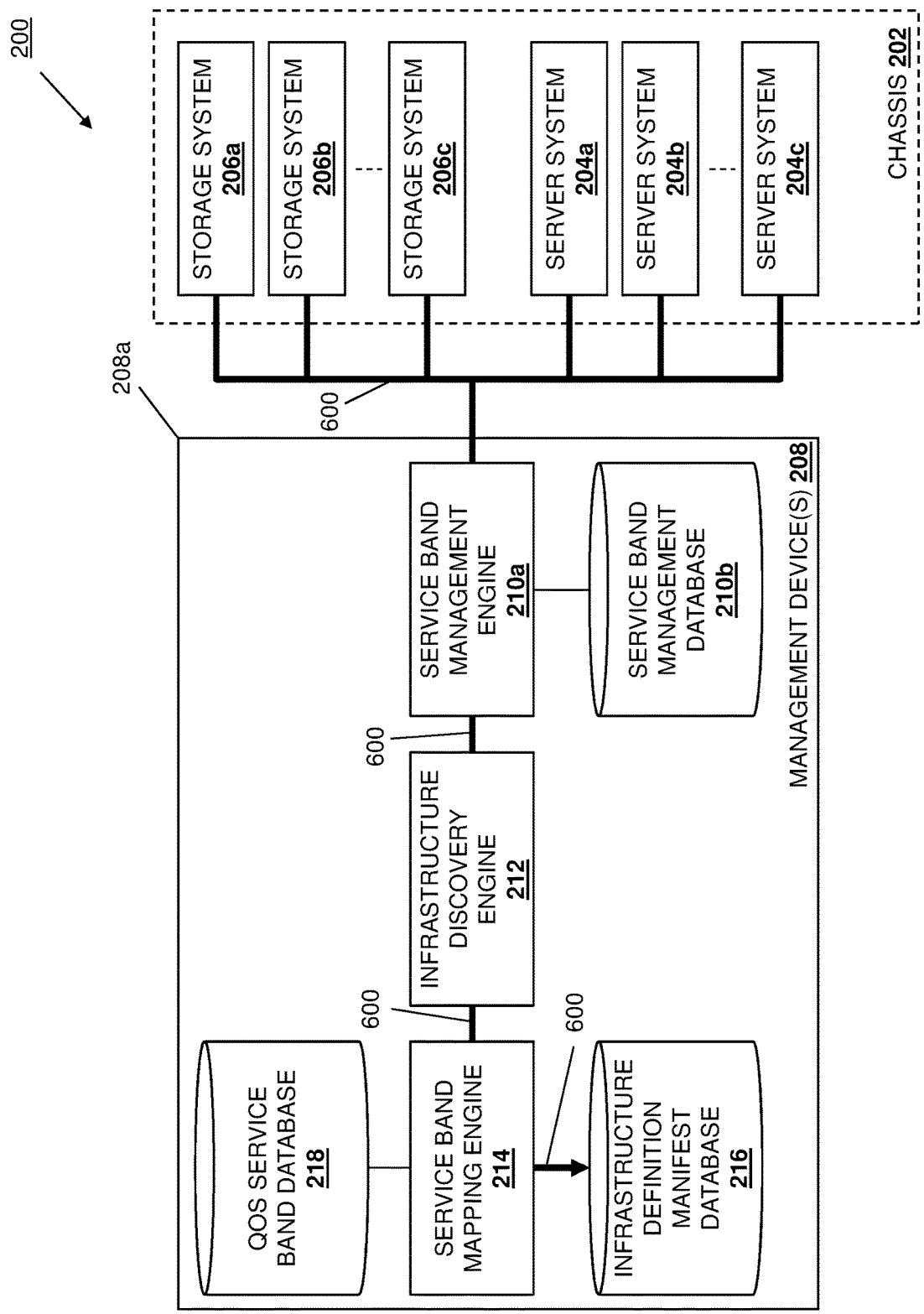
FIG. 6A is a schematic view illustrating an embodiment of the service band management system of FIG. 2 operating during the method of FIG. 5.

The method 500 begins at block 502 where management device(s) identify workload provisioning systems in a workload provisioning infrastructure. With reference to FIG. 6A, in an embodiment of block 502, the infrastructure discovery engine 212 may operate to perform workload provisioning infrastructure system discovery operations 600 to discover the server systems 204a-204c and the storage systems 206a-206c and identify those server systems 204a-204c and storage systems 206a-206c in an infrastructure definition manifest that is stored in the infrastructure definition manifest database 216. For example, the workload provisioning infrastructure system discovery operations 600 may be automatically triggered based on a predetermined scheduled or the occurrence of a discovery event, manually triggered via an instruction from a user or other administrator of the workload provisioning infrastructure or service band management system 200, and/or initiated in a variety of other manners that would be apparent to one of skill in the art in possession of the present disclosure.

In some embodiments, the identification of the workload provisioning infrastructure systems at block 502 may include the identification of any of a variety of system and/or component information about the server systems 204a-204c and storage systems 206a-206c in the infrastructure definition manifest that is stored in the infrastructure definition manifest database 216. In some examples, the identification of the workload provisioning infrastructure systems at block 502 may include the identification of general information about the server systems 204a-204c and the storage systems 206a-206c. As such, for each of the server systems 204a-204c, following block 502 the infrastructure definition manifest that is stored in the infrastructure definition manifest database 216 may include any information associated with the server system 204a (e.g., a type, manufacturer, model, etc. of that server system 204a), any information associated with the server system 204b (e.g., a type, manufacturer, model, etc. of that server system 204b), and any information associated with the server system 204c (e.g., a type, manufacturer, model, etc. of that server system 204c). Similarly, for each of the storage systems 206a-206c, following block 502 the infrastructure definition manifest that is stored in the infrastructure definition manifest database 216 may include any information associated with the storage system 206a (e.g., a type, manufacturer, model, etc. of that storage system 206a), any information associated with the storage system 206b (e.g., a type, manufacturer, model, etc. of that storage system 206b), and any information associated with the storage system 206c (e.g., a type, manufacturer, model, etc. of that storage system 206c).

In other examples and with reference to FIG. 3, the identification of the workload provisioning infrastructure systems at block 502 may include the identification of any of a variety of details about the processing system 304, the memory system 306, the communication system 308, and/or any other components in the server systems 204a-204c/300 that would be apparent to one of skill in the art in possession of the present disclosure. As such, for each of the server systems 204a-204c, following block 502 the infrastructure definition manifest that is stored in the infrastructure definition manifest database 216 may include any information associated with the processing system 304 in that server system (e.g., a type, manufacturer, model, etc., of that processing system 304), any information associated with the memory system 306 included in that server system (e.g., a type, manufacturer, model, etc., of that memory system 306), any information associated with the communication system 308 included in that server system (e.g., a type, manufacturer, model, etc., of that communication system 308), and/or information associated with any other component that one of skill in the art in possession of the present disclosure would recognize may be included in that server system and utilized for the provisioning of workloads as discussed below.

Similarly, with reference to FIG. 4, the identification of the workload provisioning infrastructure systems at block 502 may include the identification of any of a variety of details about the storage controller engine 404, the storage devices 406a-406d, the communication system 408, and/or any other components in the storage systems 206a-206c/400 that would be apparent to one of skill in the art in possession of the present disclosure. As such, for each of the storage systems 206a-206c, following block 502 the infrastructure definition manifest that is stored in the infrastructure definition manifest database 216 may include any information associated the storage controller engine 404 in that storage system (e.g., a type, manufacturer, model, etc. of that storage controller engine 404), any information associated with the storage devices 406a-406d included in that storage system (e.g., a type, manufacturer, model, etc. of those storage devices 406a-406d), any information associated with the communication system 408 included in that storage system (e.g., a type, manufacturer, model, etc. of that communication system 408), and/or information associated with any other component that one of skill in the art in possession of the present disclosure would recognize may be included in that storage system and utilized for the provisioning of workloads as discussed below. However, while a few examples of the discovery and identification of workload provisioning systems has been described, one of skill in the art in possession of the present disclosure will appreciate that the examples above may be combined (e.g., to identify general information about server systems and/or storage systems, as well as information about components included in those server systems and/or storage systems), and/or other discovery and identification techniques may be utilized to identify any information about a workload provisioning infrastructure while remaining within the scope of the present disclosure as well.

The method 500 then proceeds to block 504 where the management device(s) determine workload provisioning capabilities for the workload provisioning systems. In an embodiment, at block 504, the service band management engine 210a may operate to determine the workload provisioning capabilities for each of the workload provisioning systems identified at block 502. For example, for each server system 204a-204c and storage system 206a-206c identified in the infrastructure definition manifest that is stored in the infrastructure definition manifest database 216, the service band management engine 210a may use any information associated with those server systems 204a-204c and storage systems 206a-206c and stored in the infrastructure definition manifest to determine the workload provisioning capabilities of those server systems 204a-204c and storage systems 206a-206c.

For example, processing systems included in the server systems 204a-204c may have their workload provisioning capabilities distinguished via their SPEC CPU ratings, which may be included in the information associated with those processing systems in the infrastructure definition manifest, or accessed via a network-accessible database (not illustrated) using information associated with those processing systems in the infrastructure definition manifest. Similarly, memory systems included in the server systems 204a-204c may have their workload provisioning capabilities distinguished via their speed, type, and/or other memory characteristics, which may be included in the information associated with those memory systems in the infrastructure definition manifest, or accessed via a network-accessible database (not illustrated) using information associated with those memory systems in the infrastructure definition manifest. Similarly as well, storage devices included in the server systems 204a-204c or storage systems 206a-206c may have their workload provisioning capabilities distinguished via their class (e.g., SSD, NVMe, HDD, etc.), which may be included in the information associated with those storage devices in the infrastructure definition manifest, or accessed via a network-accessible database (not illustrated) using information associated with those storage devices in the infrastructure definition manifest.

Thus, in a specific example, following block 502 the infrastructure definition manifest that is stored in the infrastructure definition manifest database 216 may identify that that workload provisioning infrastructure includes 13$^{th}$ generation POWEREDGE® server devices available from DELL®, Inc. of Round Rock, Tex., United States, and at block 504 the service band management engine 210a may determine that the 13$^{th}$ generation POWEREDGE® server devices provide a 10 Gigabit Ethernet (GbE) network fabric communication capability (e.g., via a network-accessible database (not illustrated) including information about those type of server devices, via the information retrieved about the components of the server systems at block 502, etc.). Furthermore, at block 504 the service band management engine 210a may determine that a first subset of the 13$^{th}$ generation POWEREDGE® server devices include processing systems associated with a relatively high bin designation, along with relatively larger memory systems, while a second subset of the 13$^{th}$ generation POWEREDGE® server devices include processing systems associated with a relatively low bin designation compared to the processing systems included in the first subset of 13$^{th}$ generation POWEREDGE® server devices, along with relatively smaller memory systems compared to the memory systems included in the first subset of 13$^{th}$ generation POWEREDGE® server devices (e.g., via a network-accessible database (not illustrated) including information about those type of server devices, via the information retrieved about the components of the server systems at block 502, etc.)

Similarly, in a specific example, following block 502 the infrastructure definition manifest that is stored in the infrastructure definition manifest database 216 may identify that that workload provisioning infrastructure includes the storage system 206a having relatively fast SSD storage devices, while the storage system 206b includes an intermediate speed hybrid SSD/HDD storage device configuration, and the storage system 206c includes relatively slow HDD storage devices (i.e., as compared to the SSD storage devices included in the storage system 206a and the Hybridge SDD/HDD storage device configuration in the storage system 206b.) However, while a few specific examples of the determination of workload provisioning capabilities for workload provisioning systems provided by server systems and storage systems have been described, one of skill in the art in possession of the present disclosure will appreciate that any of a variety of workload provisioning capabilities may be determined for any of a variety of workload provisioning systems while remaining within the scope of the present disclosure as well.

Figure 6B:
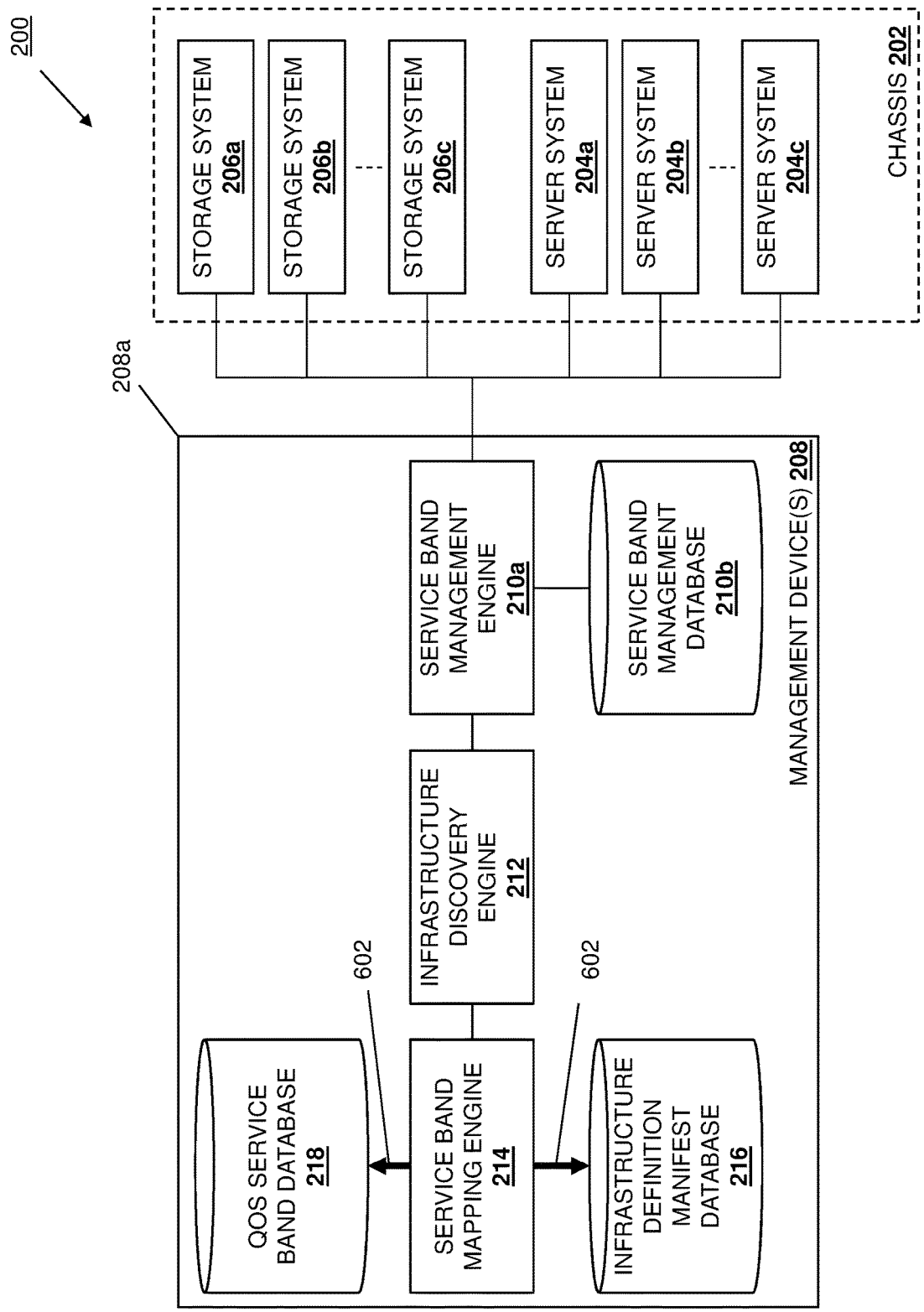
FIG. 6B is a schematic view illustrating an embodiment of the service band management system of FIG. 2 operating during the method of FIG. 5.

The method 500 then proceeds to block 506 where the management device(s) map the workload provisioning systems to service bands based on their workload provisioning capabilities. With reference to FIG. 6B, in embodiment of block 506, the server band mapping engine 214 may operate to perform mapping operations 602 to map service bands defined in the QoS service band database 218 with the workload provisioning systems identified by the infrastructure definition manifest in the infrastructure definition manifest database 216 based on the workload provisioning capabilities determined for each of those workload provisioning systems at block 504. As discussed above, in one specific example, service bands may be defined in the QoS service band database 218 that identify the highest level of workload provisioning resources that may be used to provision a workload (e.g., a "platinum" service band), a high/intermediate level of workload provisioning resources that may be used to provision a workload (e.g., a "gold" service band), a low/intermediate level of workload provisioning resources that may be used to provision a workload (e.g., a "silver" service band), and a lowest level of workload provisioning resources that may be used to provision a workload (e.g., a "bronze" service band). However, while particular service band levels are described, one of skill in the art in possession of the present disclosure will appreciate that any number of service bands may be defined in the QoS service band database 218 while remaining within the scope of the present disclosure as well.

As such, in an embodiment of block 506, the service band mapping engine 214 may perform the mapping operations 602 to map the workload provisioning systems to the service bands based on the workload provisioning capabilities of each of those workload provisioning systems. In one example, the service bands may be defined to provide particular workload provisioning capabilities such as processing capabilities (e.g., defined processing speed ranges), memory capabilities (e.g., defined memory speed ranges, defined memory latency ranges, etc.), storage capabilities (e.g., defined storage speed ranges, defined storage latency ranges, etc.), networking capabilities (e.g., defined data transmission speed ranges, defined bandwidth ranges, etc.). As such, at block 506 the service band mapping engine 214 may identify which defined service band(s) a workload provisioning system falls into based on the workload provisioning capabilities of that workload provisioning system, and map that workload provisioning system to that service band.

In another example, service bands may be defined based on an allocation of the workload provisioning capabilities of the workload provisioning infrastructure. As such, at block 506 the service band mapping engine 214 may identify the different workload provisioning capabilities of the workload provisioning systems in the workload provisioning infrastructure, and then map the workload provisioning system(s) with the highest of those workload provisioning capabilities to the "platinum" service band, map the workload provisioning system(s) with the high/intermediate level of those workload provisioning capabilities to the "gold" service band, map the workload provisioning system(s) with the low/intermediate level of those workload provisioning capabilities to the "silver" service band, and map the workload provisioning system(s) with the lowest of those workload provisioning capabilities to the "bronze" service band. However, while a few specific examples of the mapping of workload provisioning systems to service bands based on their workload provisioning capabilities have been described, one of skill in the art in possession of the present disclosure will recognize that workload provisioning systems may be mapped to service bands based on their workload provisioning capabilities in a variety of manners that will fall within the scope of the present disclosure as well.

Figure 6C:
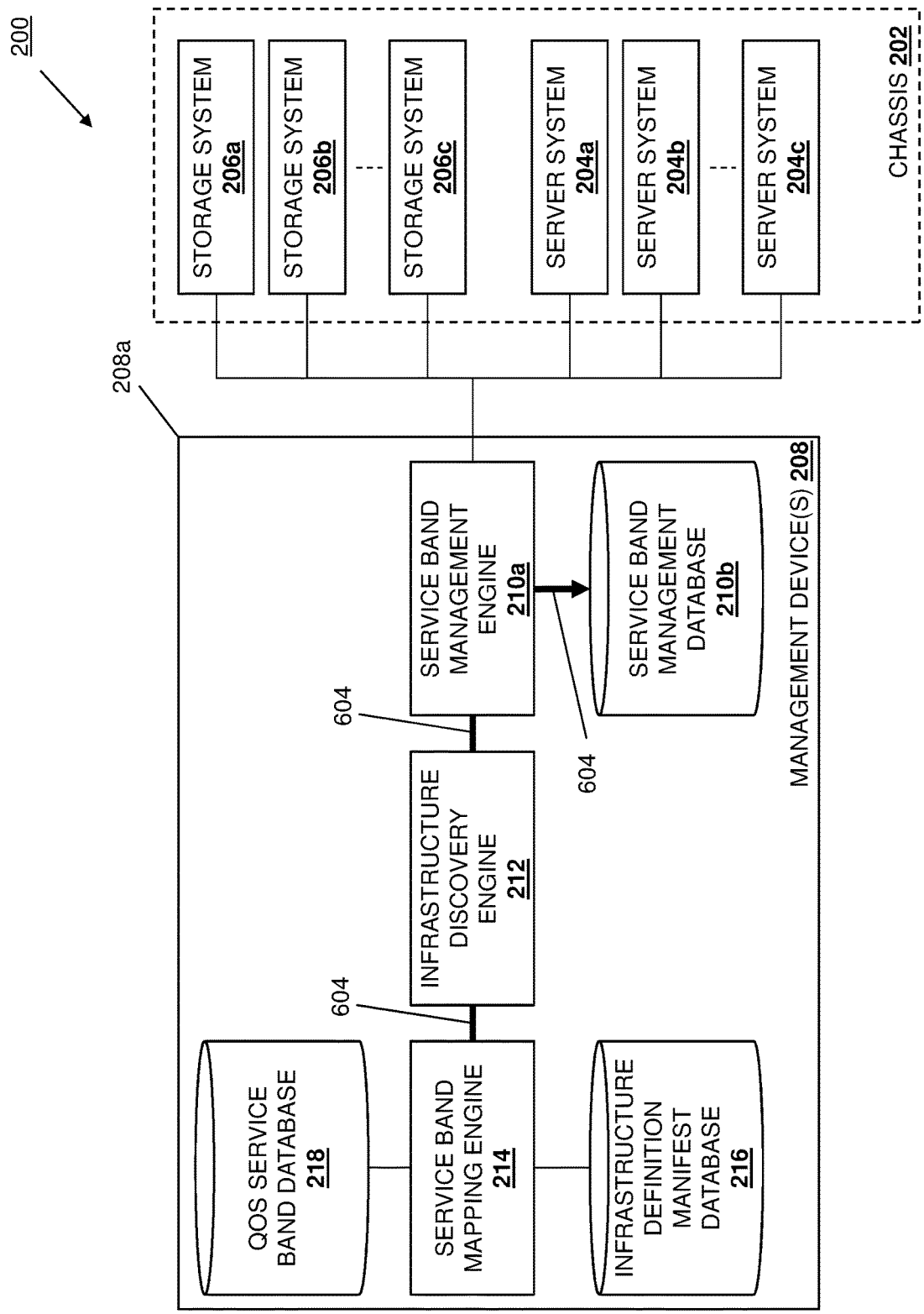
FIG. 6C is a schematic view illustrating an embodiment of the service band management system of FIG. 2 operating during the method of FIG. 5.

As illustrated in FIG. 6C, following the mapping of the workload provisioning systems to the service bands, the service band mapping engine 214 may provide the workload provisioning system/service band mappings 604 for storage in the service band management database 210b. As such, following block 506, the service band management database 210b may identify the service band provided by each of the server systems 204a-204c and the storage systems 206a-206c. Continuing with the example provided above, the first subset of the 13th generation POWEREDGE® server devices including the processing systems associated with the relatively high bin designation, along with the relatively larger memory systems, may be identified in the service band management database 210b as providing the "platinum" service band, while the second subset of the 13th generation POWEREDGE® server devices including the processing systems associated with a relatively low bin designation, along with relatively smaller memory systems, may be identified in the service band management database 210b as providing the "gold" service band. Similarly, the storage system 206a having the relatively fast SSD storage devices may be identified in the service band management database 210b as providing the "platinum" service band, the storage system 206b including the intermediate speed hybrid SSD/HDD storage device configuration may be identified in the service band management database 210b as providing the "gold" service band, and the storage system 206c including the relatively slow HDD storage devices may be identified in the service band management database 210b as providing the "silver" service band.

The method 500 then proceeds to block 508 where the management device(s) provision workloads using the workload provisioning systems based on the service bands mapped to those workload provisioning systems satisfying requirements for those workloads. In an embodiment, at block 508, the management device(s) 208 may operate to receive requests to provision workloads, identify the workload requirements for those workloads, determine the service band(s) that satisfy those workload requirements, and provision those workloads using the workload provisioning systems that have been mapped to those service band(s). For example, a host system (not illustrated, but which may be coupled to the management device(s) 208 via a network) may generate a workload provisioning request to provision a workload, and transmit that workload provisioning request to a workload provisioning engine (not specifically illustrated, but which may be included in the service band management engine 210a in some embodiments) provided in the management device(s) 208. That workload provisioning engine may then identify the workload requirements for that workload by, for example, accessing the QoS service band database 218 that details a Service Level Agreement (SLA) that defines the level of service (i.e., workload requirements in this example) that will be provided to that workload or the entity that is requesting that workload be provisioned. The workload provisioning engine may then determine which service band(s) defined in the QoS service band database 218 satisfy that SLA (i.e., the workload requirements for that workload in this example), and determine which workload provisioning systems are identified as providing those service band(s) in the service band management database 210b. The workload provisioning engine 218 may then cause that workload to be provisioned on at least one of those workload provisioning systems, and associate that workload with the workload provisioning system(s) that will provision it in the service band management database 210b.

Continuing with the example provided above, at block 508, a workload provisioning request to provision a SHAREPOINT® workload provided by software available from MICROSOFT® Corporation of Redmond, Wash., United States may be received at block 508, and at block 508 the workload provisioning engine may determine that the SHAREPOINT® workload requires a high storage system capacity and moderate storage system performance, which may result in the workload provisioning engine selecting the server systems 204a-204c and/or storage systems 204a-204c that have been identified as providing the "gold" service band for use in provisioning the SHAREPOINT® workload. However, while discussed as being selected based on system-level designation of service bands (e.g., particular server systems and storage systems providing "platinum", "gold", "silver", and "bronze" service bands), components within the server systems 204a-204c and storage systems 206a-206c may be identified as providing particular service bands, and may be used in combination to provision a workload with particular workload requirements. For example, a workload may require the highest level of processing capabilities, a high intermediate level of memory capabilities, and a low-intermediate level of storage capabilities, and at block 508 the workload provision engine may cause that workload to be provisioned using a processing system in a server system that has been identified as providing the "platinum" service band, a memory system in a server system that has been identified as providing the "gold" service band, and a storage device in a server system or storage system that has been identified as providing the "silver" service band. However, while a few examples have been described, one of skill in the art in possession of the present disclosure will recognize that workloads may be provided according to the workload provisioning system/service band mappings described herein in a variety of manners that will fall within the scope of the present disclosure as well.

The method 500 then proceeds to decision block 510 where it is determined whether a new workload provisioning system has been added to the workload provisioning infrastructure. In an embodiment, at decision block 510, the infrastructure discovery engine 212 may operate to perform workload provisioning infrastructure system discovery operations to determine whether a new workload provisioning system has been added to the workload provisioning infrastructure. For example, similarly as discussed above, the workload provisioning infrastructure system discovery operations may be automatically triggered based on a predetermined scheduled or the occurrence of a discovery event (e.g., such as the addition of a new workload provisioning system to the workload provisioning infrastructure, described below), manually triggered by via an instruction from a user or other administrator of the workload provisioning infrastructure or service band management system 200, and/or initiated in a variety of other manners that would be apparent to one of skill in the art in possession of the present disclosure.

If, at decision block 510, it is determined that no new workload provisioning system has been added to the workload provisioning infrastructure, the method 500 continues to loop at decision block 510 to determine whether a new workload provisioning system has been added to the workload provisioning infrastructure. As discussed below, recalculation of service bands, remapping of workload provisioning systems to service bands, modification of service bands, and modification of workload placements may be performed following the addition of a new workload provisioning system to the workload provisioning infrastructure. However, in some situations, the recalculation of service bands, remapping of workload provisioning systems to service bands, modification of service bands, and modification of workload placements may be performed without the addition of a new workload provisioning system to the workload provisioning infrastructure while remaining within the scope of the present disclosure as well.

Figure 6D:
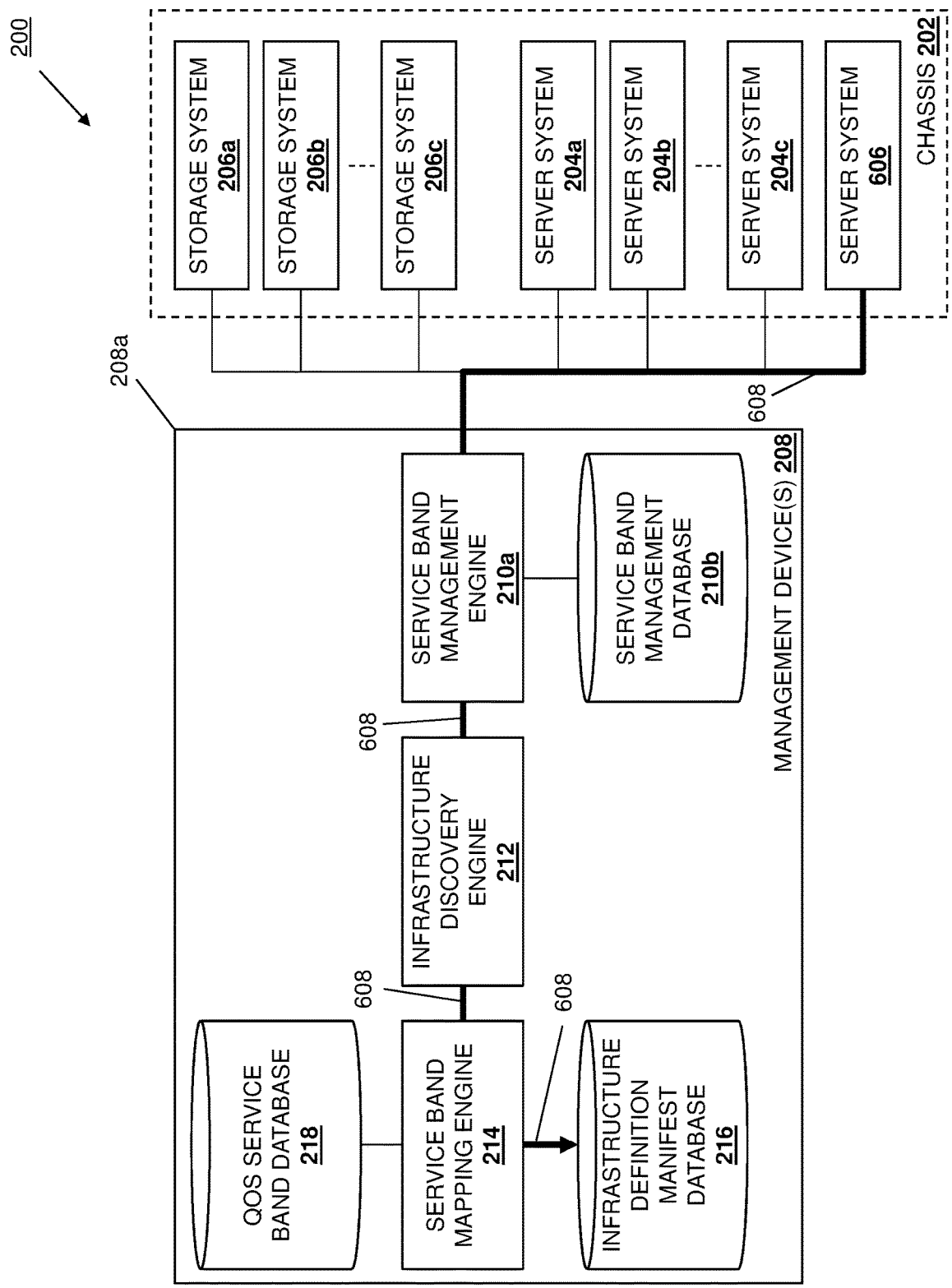
FIG. 6D is a schematic view illustrating an embodiment of the service band management system of FIG. 2 operating during the method of FIG. 5.
Figure 6E:
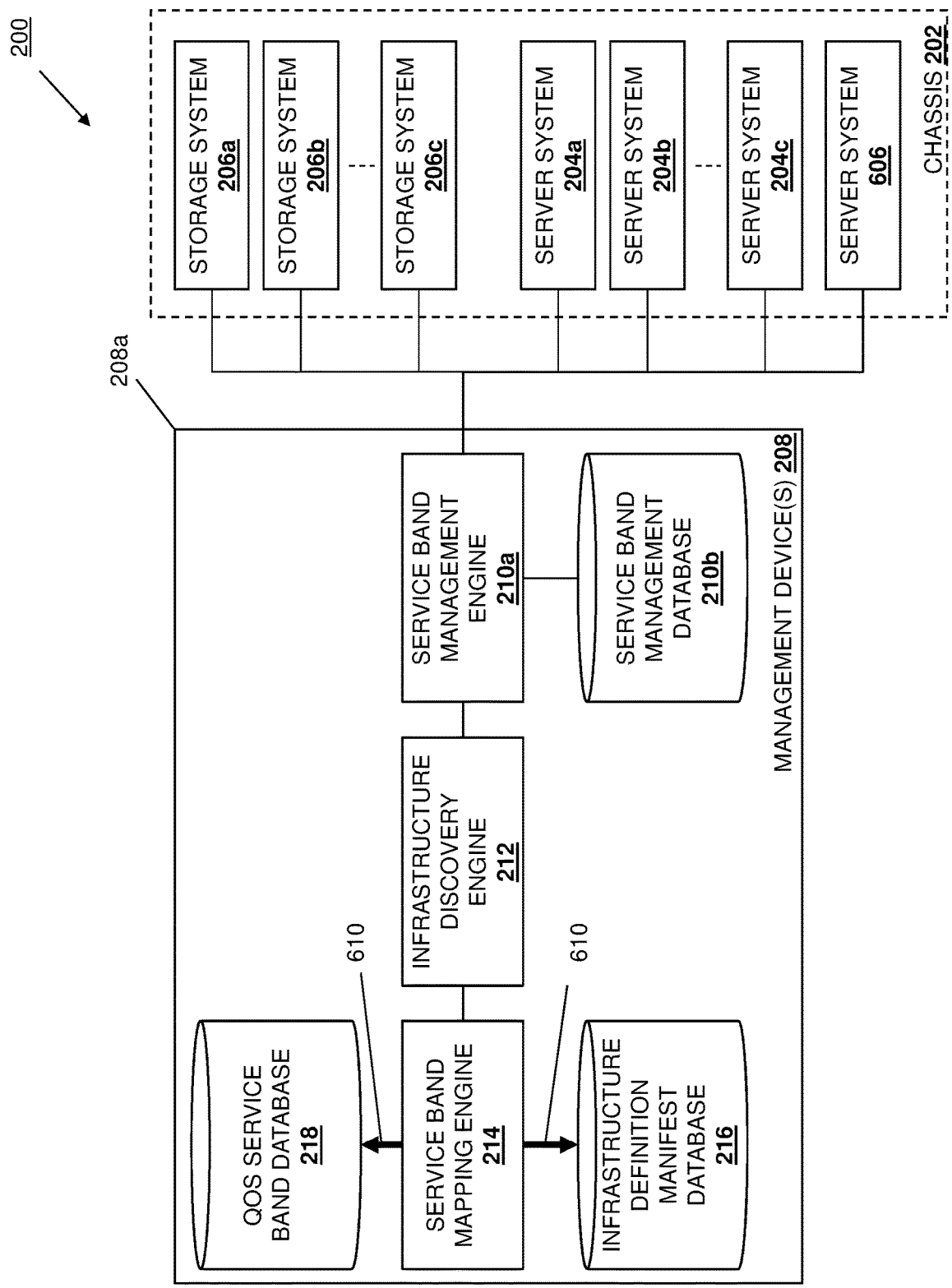
FIG. 6E is a schematic view illustrating an embodiment of the service band management system of FIG. 2 operating during the method of FIG. 5.

If at decision block 510, it is determined that a new workload provisioning system has been added to the workload provisioning infrastructure, the method 500 proceeds to block 512 where the management device(s) determine workload provisioning capabilities for the new workload provisioning system. With reference to FIG. 6D, a workload provisioning system provided by a server system 606 is illustrated as having been added to the workload provisioning infrastructure, and at decision block 510 the infrastructure discovery engine 212 may operate to perform workload provisioning infrastructure system discovery operations 608 to discover the server system 606 has been added to the workload provisioning infrastructure, and may operate to identify the server system 606 in the infrastructure definition manifest that is stored in the infrastructure definition manifest database 216 in substantially the same manner as discussed above with reference to block 504.

As such, following the identification that the server system 606 has been added to the workload provisioning system, the infrastructure definition manifest may store any information associated with the server system 606 (e.g., a type, manufacturer, model, etc. of that server system 606), any information associated with the processing system 304 in that server system 606 (e.g., a type, manufacturer, model, etc. of that processing system 304), any information associated with the memory system 306 included in that server system 606 (e.g., a type, manufacturer, model, etc. of that memory system 306), any information associated with the communication system 308 included in that server system 606 (e.g., a type, manufacturer, model, etc. of that communication system 308), and/or information associated with any other component that one of skill in the art in possession of the present disclosure would recognize may be included in that server system 606 and utilized for the provisioning of workloads as discussed below.

Thus, in an embodiment of block 512, the service band management engine 210a may operate to determine the workload provisioning capabilities for the server system 606. For example, the service band management engine 210a may use any information associated with the server system 606 and stored in the infrastructure definition manifest to determine the workload provisioning capabilities of that server system 606. As such, the processing system included in the server system 606 may have its workload provisioning capabilities defined via its specification CPU rating, which may be included in the information associated with that processing system in the infrastructure definition manifest, or accessed via a network-accessible database (not illustrated) using information associated with that processing system in the infrastructure definition manifest. Similarly, the memory system included in the server system 606 may have its workload provisioning capabilities defined via its speed, type, and/or other memory characteristics, which may be included in the information associated with that memory system in the infrastructure definition manifest, or accessed via a network-accessible database (not illustrated) using information associated with that memory system in the infrastructure definition manifest. Similarly as well, storage devices included in the server system 606 may have its workload provisioning capabilities distinguished via their class (e.g., SSD, NVMe, HDD, etc.), which may be included in the information associated with those storage devices in the infrastructure definition manifest, or accessed via a network-accessible database (not illustrated) using information associated with those storage devices in the infrastructure definition manifest Continuing with the example above, following block 512, the infrastructure definition manifest that is stored in the infrastructure definition manifest database 216 may identify that the server system 606 is provided by a $14^{th}$ generation POWEREDGE® server device available from DELL®, Inc. of Round Rock, Tex., United States, and at block 504 the service band management engine 210a may determine that the 14th generation POWEREDGE® server device provides a 25 Gigabit Ethernet (GbE) network fabric communication capability (e.g., via a network-accessible database (not illustrated) including information about that type of server device, via the information retrieved about the components of the server system 606, etc.). Furthermore, at block 512 the service band management engine 210a may determine that the $14^{th}$ generation POWEREDGE® server device includes a processing system associated with a high bin designation that is similar to that of the first subset of $13^{th}$ generation POWEREDGE® server devices discussed above, along with a relatively larger memory system that is similar to that of the first subset of $13^{th}$ generation POWEREDGE® server devices discussed above.

The method 500 then proceeds to block 514 where the management device(s) recalculate the service bands. In an embodiment, at block 514, the service band management engine 210a may operate to recalculate the server bands defined in the QoS service band database 218 in consideration of the workload provisioning capabilities of the server system 606 that was added to the workload provisioning infrastructure. For example, in embodiments such as the example above, the server system 606 is a newer generation server system than the existing server systems 204a-204c, and provides enhanced workload provisioning capabilities relative to the workload provisioning capabilities provided by the existing server systems 204a-204c. As such, the service band management engine 210a may identify the addition of enhanced workload provisioning capabilities to the workload provisioning infrastructure and, in response, may recalculate the service bands defined in the QoS service band database 218 by redefining the "platinum" service band as including at least some of those enhanced workload provisioning capabilities, redefining the "gold" service band as including at least some workload provisioning capabilities that were previously defined as part of the "platinum" service band, and so on. Continuing with the example provided above, the identification of the 14th generation POWEREDGE® server device that provides the 25 Gigabit Ethernet (GbE) network fabric communication capability may result in the service band management engine 210a recalculating the "platinum" service band as providing at least that 25 Gigabit Ethernet (GbE) network fabric communication capability (along with the relatively high bin designation processing system and relatively larger memory system), recalculating the "gold" server band as providing at least the 10 Gigabit Ethernet (GbE) network fabric communication capability (along with the relatively high bin designation processing system and relatively larger memory system) provided by the 13th generation POWEREDGE® server devices, and so.

However, while the recalculation of service bands is discussed above as occurring upon the addition of newer, higher capability workload provisioning systems to the workload provisioning infrastructure, in some embodiments service bands may be recalculated in other scenarios as well. For example, situations may arise in which workload provisioning systems are removed from the workload provisioning infrastructure, or become unavailable, and in those situations the service band management engine 210a may operate to recalculate the server bands defined in the QoS service band database 218 in consideration of the workload provisioning capabilities provided by the remaining workload provisioning systems. As such, the loss of workload provisioning systems from the workload provisioning infrastructure may be identified by the service band management engine 210a and, in response, the service band management engine 210a may recalculate the service bands defined in the QoS service band database 218 by redefining the "platinum" service band as including at least some degraded workload provisioning capabilities, redefining the "gold" service band as including at least some workload provisioning capabilities that were previously defines as part of the "silver" service band, and so on. However, while a few specific examples have been described, one of skill in the art in possession of the present disclosure will recognize that service band recalculation according to the teachings of the present disclosure may be performed in a variety of manners (e.g., within the addition or removal of workload provisioning systems from the workload provisioning infrastructure) to provide a variety of different service bands while remaining within the scope of the present disclosure as well.

The method 500 then proceeds to block 516 where the management device(s) remap workload provisioning systems to service bands based on their workload provisioning capabilities. In an embodiment, at block 516, the server band mapping engine 214 may operate to perform remapping operations 610 to remap the recalculated/redefined service bands stored in the QoS service band database 218 with the workload provisioning systems identified in the infrastructure definition manifest in the infrastructure definition manifest database 216 based on the workload provisioning capabilities determined for each of the workload provisioning systems that were previously identified at block 502 ("previous" workload provisioning systems) and the new workload provisioning system identified at decision block 510. As such, in an embodiment of block 516, the service band mapping engine 214 may perform the remapping operations 610 to remap the previous workload provisioning systems and the new workload provisioning system to the recalculated/redefined service bands based on the workload provisioning capabilities of each of those workload provisioning systems. Similarly as described above, at block 516 the service band mapping engine 214 may identify which defined recalculated/redefined service band(s) a workload provisioning system falls into, and map that workload provisioning system to that service band.

Also similarly as described above, in some examples the recalculated/redefined service bands may be defined based on an allocation of the updated/enhanced workload provisioning capabilities of the workload provisioning infrastructure. As such, at block 516 the service band mapping engine 214 may identify the different workload provisioning capabilities of the previous and new workload provisioning systems in the workload provisioning infrastructure, and then map the workload provisioning system(s) with the highest of those workload provisioning capabilities (e.g., the new workload provisioning system in this example) to the recalculated/redefined "platinum" service band, map the workload provisioning system(s) with the high/intermediate level of those workload provisioning capabilities to the recalculated/redefined "gold" service band, map the workload provisioning system(s) with the low/intermediate level of those workload provisioning capabilities to the recalculated/redefined "silver" service band, and map the workload provisioning system(s) with the lowest of those workload provisioning capabilities to the recalculated/redefined "bronze" service band. However, while a few specific examples of the mapping of workload provisioning systems to recalculated/redefined service bands based on their workload provisioning capabilities have been described, one of skill in the art in possession of the present disclosure will recognize that workload provisioning systems may be mapped to recalculated/redefined service bands based on their workload provisioning capabilities in a variety of manners that will fall within the scope of the present disclosure as well.

Figure 6F:
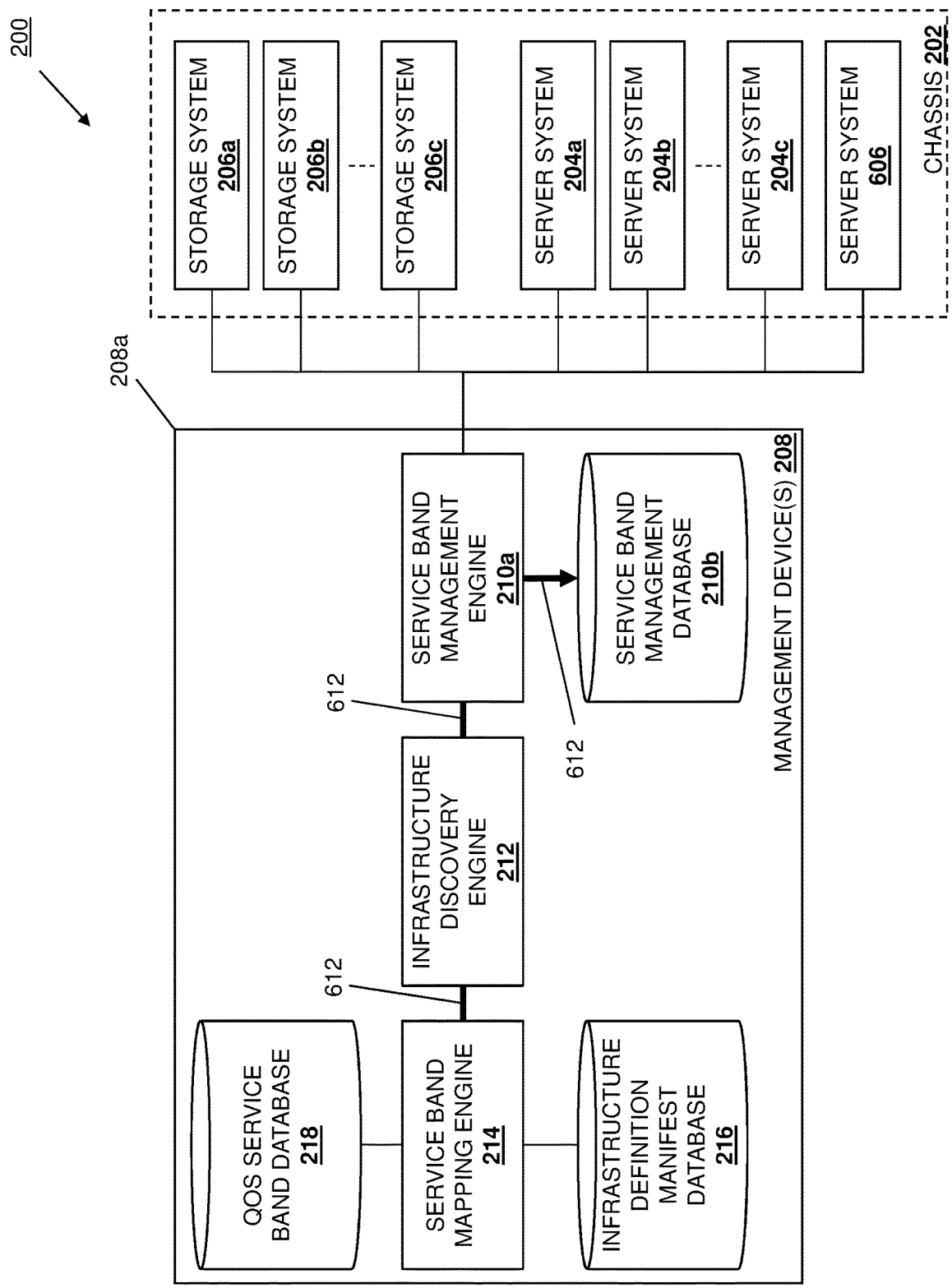
FIG. 6F is a schematic view illustrating an embodiment of the service band management system of FIG. 2 operating during the method of FIG. 5.

As illustrated in FIG. 6F, following the mapping of the workload provisioning systems to the service bands, the service band mapping engine 214 may provide the workload provisioning system/service band remappings 612 for storage in the service band management database 210b. As such, following block 516, the service band management database 210b may identify the service band provided by each of the server systems 204a-204c and 606, and the storage systems 206a-206c. Continuing with the example provided above, the 14th generation POWEREDGE® server devices may be identified in the service band management database 210b as providing the "platinum" service band, the first subset of the 13th generation POWEREDGE® server devices including the processing systems associated with the relatively high bin designation, along with the relatively larger memory systems, may be identified in the service band management database 210b as providing the "gold" service band, while the second subset of the 13th generation POWEREDGE® server devices including the processing systems associated with a relatively low bin designation, along with relatively smaller memory systems, may be identified in the service band management database 210b as providing the "silver"

service band. Similarly, the storage system 206a having the relatively fast SSD storage devices may be identified in the service band management database 210b as providing the "platinum" service band, the storage system 206b including the intermediate speed hybrid SSD/HDD storage device configuration may be identified in the service band management database 210b as providing the "gold" service band, and the storage system 206c including the relatively slow HDD storage devices may be identified in the service band management database 210b as providing the "silver" service band.

The method 500 may then proceed to optional block 518 where the management device(s) modify one or more service bands. In an embodiment, at optional block 518, the service band management engine 210a may retrieve historical data about the provisioning of workloads using the workload provisioning systems based on the service bands of those workload provisioning systems satisfying workload requirements for the workload, and in some cases may modify the definition of one or more services bands. For example, the provisioning of workloads by the workload provisioning infrastructure (e.g., at block 508 of the method 500 as discussed above) may generate workload provisioning information associated with the performance of the workload, the use of the workload provisioning system(s) used to provide that workload, and/or any other workload provisioning data that would be apparent to one of skill in the art in possession of the present disclosure, and that workload provisioning information may be stored in a historical workload provisioning database (not illustrated explicitly, but which may be included in the service band management database 210b) that is accessible to the service band management engine 210a.

As such, in some embodiments, at optional block 518 the service band management engine 210a may access the historical workload provisioning database and analyze the workload provisioning information stored therein in order to modify the service bands defined in the QoS service band database 218. For example, the use of the workload provisioning system(s) used to provide workload(s), the performance of those workload(s), and/or any other workload provisioning information may be analyzed to identify when workload provisioning systems allocated to workload are being underutilized or overutilized, when workload provisioning systems allocated to workloads are providing for a desired performance of those workloads, and/or any of a variety of workload provisioning characteristics that would be apparent to one of skill in the art in possession of the present disclosure.

Thus, the analysis of the workload provisioning information in the historical workload provisioning database may allow the service band management engine 210a to identify whether a service band provides desired workload provisioning characteristics, or whether that service band may be modified (i.e., be redefined as guaranteeing a different level of processing performance, memory performance, storage performance, networking performance, etc.) to ensure efficient utilization of workload provisioning systems that are mapped to that service band. However, while a few examples of the modification of service bands have been described, one of skill in the art in possession of the present disclosure will appreciate that service bands may be modified using a variety of techniques and in a variety of manners that will fall within the scope of the present disclosure as well. As will be appreciated by one of skill in the art in possession of the present disclosure, the looping of the method 500 allows optional block 508 to be performed in manner that "fine-tunes" the service band definitions (e.g., the workload provisioning capabilities required for any particular service band) in order to provide for more efficient workload placement (discussed in further detail below.)

The method 500 may then proceed to optional block 520 where the management device(s) modify workload placement(s). In an embodiment, at optional block 520, the service band management engine 210a may operate to modify the placement of workloads by modifying which workload provisioning systems are allocated to provision those workloads. For example, similarly as discussed above with reference to block 508, the workload provisioning engine may utilize workload requirements for each workload being provided by the workload provisioning infrastructure, and at optional block 520 may cause at least one workload that is being provided by one or more first workload provisioning systems in the workload provisioning infrastructure to be provided by one or more second workload provisioning systems in the workload provisioning infrastructure that are different than the one or more first workload provisioning systems. As will be appreciated by one of skill in the art in possession of the present disclosure, the modification of the placement of workloads may be performed in response to the addition of workload provisioning systems to the workload provisioning infrastructure, the removal of workload provisioning systems from the workload provisioning infrastructure, the recalculation/redefinition of the service bands, and/or the modification of the services bands discussed above, any of which (or any combination of which) may result in the workload provisioning engine providing for modified workload placement in order to ensure efficient operation and use of the workload provisioning infrastructure.

Continuing with the example provided above, in one specific example, the service band management engine 210a may determine that the SHAREPOINT® workload discussed above may have been consuming resources above its original workload requirements. For example, it may be determined that the SHAREPOINT® workload has previously been consuming all of the 10 GbE network bandwidth available from the $13^{th}$ generation POWEREDGE® server devices in the "platinum" service band discussed above. As such, upon the addition of the $14^{th}$ generation POWEREDGE® server device discussed above, and the recalculated service bands such that the "platinum" service band is provided by that $14^{th}$ generation POWEREDGE® server device, the service band management engine 210a may modify the placement of the SHAREPOINT® workload such that, instead of being provisioned by the $13^{th}$ generation POWEREDGE® server devices, it is provisioned by the $14^{th}$ generation POWEREDGE® server device. In some examples, portions of the SHAREPOINT® workload may be provisioned by the $14^{th}$ generation POWEREDGE® server device (e.g., web front end instances for the SHAREPOINT® workload that require the higher networking bandwidth available from the $14^{th}$ generation POWEREDGE® server device), while portions of the SHAREPOINT® workload may be continued to be provisioned by the $13^{th}$ generation POWEREDGE® server devices (e.g., database and application instances for the SHAREPOINT® workload) despite the downgrade of the $13^{th}$ generation POWEREDGE® server devices from the "gold" service band to the "silver" service band. As will be appreciated by one of skill in the art in possession of the present disclosure, the modification of the workload placement may be updated in the service band management database 210b accordingly.

Thus, systems and methods have been described that provide for the management of service bands (e.g., "platinum", "gold", "silver", and "bronze" service bands) utilized in the provisioning of workloads via a server nodes. For example, when new server nodes are added to a server infrastructure, those new server nodes may be identified, and the workload provisioning capabilities for those new server nodes may be determined. In addition, the prior utilization of the server nodes by the workloads provided by those server nodes prior to the addition of the new server nodes may be determined, and the service bands may be recalculated and/or the server nodes (including the new server nodes) may be mapped/remapped to service bands based on their workload provisioning capabilities and prior utilization of the server nodes. As such, the systems and methods of the present disclosure may operate to modify the definitions of service bands and/or modify workload placements whenever a situation is discovered that allows for the optimization of the utilization of the server node infrastructure in provisioning workloads based on the requirements for those workloads.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A service band management system, comprising:
a workload provisioning infrastructure; and
at least one management device that is coupled to the workload provisioning infrastructure, wherein the at least one management device is configured to:
identify a first workload provisioning system that is included in the workload provisioning infrastructure;
determine a first workload provisioning capability for the first workload provisioning system;
map, based on the first workload provisioning capability, the first workload provisioning system to a first service band that is included in a plurality of service bands and that is defined as being provided by workload infrastructure systems operating at one or more first characteristics;
provision a workload using the first workload provisioning system based on the first service band satisfying a workload requirement for the workload;
identify, subsequent to provisioning a workload using the first workload provisioning system, that a second workload provisioning system has been added to the workload provisioning infrastructure;
determine a second workload provisioning capability for the second workload provisioning system that is different than the first workload provisioning capability of the first workload provisioning system;
automatically redefine, based on the second workload provisioning capability:
the first service band as being provided by workload infrastructure systems operating at one or more second characteristics that are higher than the one or more first characteristics; and
a second service band that is included in the plurality of service bands as being provided by workload infrastructure systems operating at the one or more first characteristics; and
automatically remap, based on the first workload provisioning capability and the second workload provisioning capability, the first workload provisioning system to the second service band.

2. The system of claim 1, wherein the at least one management device is configured to:
map the second workload provisioning system to the first service band; and
provision the workload using the second workload provisioning system based on the first service band satisfying the workload requirement for the workload.

3. The system of claim 1, wherein the at least one management device is configured to:
provision the workload using the first workload provisioning system based on the second service band satisfying the workload requirement for the workload.

4. The system of claim 1, wherein the at least one management device is configured to:
generate and transmit, in response to the automatic remapping of the first workload provisioning system to the second service band, a workload placement recommendation that recommends provisioning the workload using the second workload provisioning system.

5. The system of claim 1, wherein the at least one management device is configured to:
retrieve historical data about the provisioning of the workload using the first workload provisioning system based on the first service band satisfying a workload requirement for the workload; and
define the second service band as being provided by workload infrastructure systems operating at the one or more first characteristics based on the historical data.

6. The system of claim 1, wherein the first workload provisioning system includes at least one of a server device or a storage device.

7. An Information Handling System (IHS), comprising:
a processing system; and
a memory system that is coupled to the processing system and that includes instructions that, when executed by the processing system, cause the processing system to provide a service band management engine that is configured to:
identify a first workload provisioning system that is included in a workload provisioning infrastructure;
determine a first workload provisioning capability for the first workload provisioning system;
map, based on the first workload provisioning capability, the first workload provisioning system to a first service band that is included in a plurality of service bands and that is defined as being provided by workload infrastructure systems operating at one or more first characteristics;
provision a workload using the first workload provisioning system based on the first service band satisfying a workload requirement for the workload;
identify, subsequent to provisioning a workload using the first workload provisioning system, that a second workload provisioning system has been added to the workload provisioning infrastructure;
determine a second workload provisioning capability for the second workload provisioning system that is different than the first workload provisioning capability of the first workload provisioning system;
automatically redefine, based on the second workload provisioning capability:
the first service band as being provided by workload infrastructure systems operating at one or more second characteristics that are higher than the one or more first characteristics; and
a second service band that is included in the plurality of service bands as being provided by workload infrastructure systems operating at the one or more first characteristics; and
automatically remap, based on the first workload provisioning capability and the second workload provisioning capability, the first workload provisioning system to the second service band.

8. The IHS of claim 7, wherein the service band management engine is configured to:
map the second workload provisioning system to the first service band; and
provision the workload using the second workload provisioning system based on the first service band satisfying the workload requirement for the workload.

9. The IHS of claim 7, wherein the service band management engine is configured to:
provision the workload using the first workload provisioning system based on the second service band satisfying the workload requirement for the workload.

10. The IHS of claim 7, wherein the determining the second workload provisioning capability for the second workload provisioning system that is different than the first workload provisioning capability of the first workload provisioning system includes:
determining that at least one of second processing system capabilities, second memory system capabilities, or second storage system capabilities of the second workload provisioning system are different than at least one of first processing system capabilities, first memory system capabilities, or first storage system capabilities of the first workload provisioning system.

11. The IHS of claim 7, wherein the service band management engine is configured to:
retrieve historical data about the provisioning of the workload using the first workload provisioning system based on the first service band satisfying a workload requirement for the workload; and
define the second service band as being provided by workload infrastructure systems operating at the one or more first characteristics based on the historical data.

12. The IHS of claim 7, wherein the first workload provisioning system includes at least one of a server device or a storage device.

13. The IHS of claim 7, wherein the service band management engine is configured to
generate and transmit, in response to the automatic remapping of the first workload provisioning system to the second service band, a workload placement recommendation that recommends provisioning the workload using the second workload provisioning system.

14. A method for service band management, comprising:
identifying, by at least one management device, a first workload provisioning system that is included in a workload provisioning infrastructure;
determining, by the at least one management device, a first workload provisioning capability for the first workload provisioning system;
mapping, by the at least one management device based on the first workload provisioning capability, the first workload provisioning system to a first service band that is included in a plurality of service bands and that is defined as being provided by workload infrastructure systems operating at one or more first characteristics;
provisioning, by the at least one management device, a workload using the first workload provisioning system based on the first service band satisfying a workload requirement for the workload;
identifying, by the at least one management device subsequent to provisioning a workload using the first workload provisioning system, that a second workload provisioning system has been added to the workload provisioning infrastructure;
determining, by the at least one management device, a second workload provisioning capability for the second workload provisioning system that is different than the first workload provisioning capability of the first workload provisioning system;
automatically redefining, based on the second workload provisioning capability:
the first service band as being provided by workload infrastructure systems operating at one or more second characteristics that are higher than the one or more first characteristics; and
a second service band that is included in the plurality of service bands as being provided by workload infrastructure systems operating at the one or more first characteristics; and
automatically remapping, by the at least one management device based on the first workload provisioning capability and the second workload provisioning capability, the first workload provisioning system to the second service band.

15. The method of claim 14, further comprising:
mapping, by the at least one management device, the second workload provisioning system to the first service band; and
provisioning, by the at least one management device, the workload using the second workload provisioning system based on the first service band satisfying the workload requirement for the workload.

16. The method of claim 14, further comprising:
provisioning, by the at least one management device, the workload using the first workload provisioning system based on the second service band satisfying the workload requirement for the workload.

17. The method of claim 14, wherein the determining the second workload provisioning capability for the second workload provisioning system that is different than the first workload provisioning capability of the first workload provisioning system includes:
determining that at least one of second processing system capabilities, second memory system capabilities, or second storage system capabilities of the second workload provisioning system are different than at least one of first processing system capabilities, first memory system capabilities, or first storage system capabilities of the first workload provisioning system.

18. The method of claim 14, further comprising:
retrieving, by the at least one management device, historical data about the provisioning of the workload using the first workload provisioning system based on the first service band satisfying a workload requirement for the workload; and
defining, by the at least one management device, the second service band as being provided by workload infrastructure systems operating at the one or more first characteristics based on the historical data.

19. The method of claim 14, wherein the first workload provisioning system includes at least one of a server device or a storage device.

20. The method of claim 14, further comprising:
generating and transmitting, by the at least one management device in response to the automatic remapping of the first workload provisioning system to the second service band, a workload placement recommendation that recommends provisioning the workload using the second workload provisioning system.

\* \* \* \* \*